US008866970B1

(12) United States Patent
Lemoine

(10) Patent No.: US 8,866,970 B1
(45) Date of Patent: Oct. 21, 2014

(54) METHOD FOR REAL-TIME PROCESSING OF A VIDEO SEQUENCE ON MOBILE TERMINALS

(71) Applicant: Phonitive, Toulouse (FR)

(72) Inventor: Guillaume Lemoine, Toulouse (FR)

(73) Assignee: Phonitive, Toulouse (FR)

( * ) Notice: Subject to any disclaimer, the term of this patent is extended or adjusted under 35 U.S.C. 154(b) by 0 days.

(21) Appl. No.: 14/364,941

(22) PCT Filed: Dec. 17, 2012

(86) PCT No.: PCT/EP2012/075828
§ 371 (c)(1),
(2), (4) Date: Jun. 12, 2014

(87) PCT Pub. No.: WO2013/087935
PCT Pub. Date: Jun. 20, 2013

(30) Foreign Application Priority Data

Dec. 16, 2011 (FR) ...................................... 11 61847

(51) Int. Cl.
*H04N 5/45* (2011.01)
*H04N 5/265* (2006.01)
*H04N 9/64* (2006.01)
*H04N 5/04* (2006.01)

(52) U.S. Cl.
CPC ................ *H04N 5/265* (2013.01); *H04N 9/64* (2013.01); *H04N 5/04* (2013.01)
USPC ........... 348/565; 348/561; 348/563; 348/564; 348/566; 348/569; 348/581; 348/584; 348/585; 348/586; 348/588; 348/598; 348/333.02; 348/333.03; 348/333.12; 345/625; 345/629; 345/630; 345/634; 382/298; 382/284; 382/232

(58) Field of Classification Search
USPC ......... 348/565, 561, 563, 564, 566, 569, 581, 348/584, 585, 586, 588, 598, 333.2, 333.03, 348/333.12; 345/625, 629, 630, 634; 382/298, 284, 232
See application file for complete search history.

(56) References Cited

U.S. PATENT DOCUMENTS

| 5,398,074 | A | * | 3/1995 | Duffield et al. | ............... | 348/564 |
| 6,008,860 | A | * | 12/1999 | Patton et al. | .................. | 348/565 |
| 6,201,879 | B1 | * | 3/2001 | Bender et al. | ................. | 382/100 |

(Continued)

OTHER PUBLICATIONS

Apple, "imovie for ipad 2: tutorial," Apr. 1, 2011, http://www.youtube.com/watch?v=MEaWuCrl24s.

(Continued)

*Primary Examiner* — Jefferey Harold
*Assistant Examiner* — Mustafizur Rahman
(74) *Attorney, Agent, or Firm* — IM IP Law PLLC; C. Andrew Im

(57) ABSTRACT

A method for embedding an image in a video sequence for a mobile terminal. Preferably, the mobile terminal is a tablet or smartphone. The method comprises the steps of choosing an image to be embedded, reading the video sequence, displaying a frame, and determining the presence of an embedding zone in the frame. The embedding zone having been previously identified or deduced according to a predefined algorithm. The method further comprises the step of applying a deformation to the image to be embedded such that the image to be embedded coincides with the form of the embedding zone. The image combining the frame and the image to be embedded is displayed/disposed in place of the embedding zone.

14 Claims, 2 Drawing Sheets

(56) References Cited

U.S. PATENT DOCUMENTS

| | | | |
|---|---|---|---|
| 6,359,657 B1* | 3/2002 | Westerink et al. | 348/584 |
| 6,396,543 B1* | 5/2002 | Shin et al. | 348/452 |
| 6,473,102 B1* | 10/2002 | Rodden et al. | 715/788 |
| 6,493,038 B1* | 12/2002 | Singh et al. | 348/565 |
| 6,542,621 B1* | 4/2003 | Brill et al. | 382/103 |
| 6,778,224 B2* | 8/2004 | Dagtas et al. | 348/586 |
| 7,206,029 B2* | 4/2007 | Cohen-Solal | 348/565 |
| 7,844,000 B2* | 11/2010 | Dolbear et al. | 375/240.25 |
| 2002/0070957 A1* | 6/2002 | Trajkovic et al. | 345/719 |
| 2002/0075407 A1* | 6/2002 | Cohen-Solal | 348/565 |
| 2002/0140862 A1* | 10/2002 | Dimitrova et al. | 348/565 |
| 2004/0062304 A1* | 4/2004 | Dolbear et al. | 375/240.1 |
| 2007/0195196 A1* | 8/2007 | Lam et al. | 348/565 |
| 2009/0051813 A1* | 2/2009 | Sasao et al. | 348/565 |
| 2009/0204920 A1* | 8/2009 | Beverley et al. | 715/768 |
| 2010/0188579 A1* | 7/2010 | Friedman | 348/565 |
| 2011/0321084 A1* | 12/2011 | Takahashi et al. | 725/32 |

OTHER PUBLICATIONS

Ralf Rottmann, "Layar gets some serious competition: junaio brings 3D augmented reality to your iphone," Aug. 29, 2009, pp. 1-8, http://thenextweb.com/apps/2009/10/29/layar-competition-junaio-brings-3d-augmented-reality-iphone/.

Eliot Van Buskirk, 3-D maps, Camera Phones Put 'Reality' in Augmented Reality, Dec. 11, 2009, pp. 1-9, http://www.wired.com/epicenter/2009/12/3d-maps-camera-phones-put-reality-in-augmented-reality/.

Litrik De Roy, "Developing an augmented reality layer for Layar," May 8, 2010, pp. 1-2, http://www.slideshare.net/litrik/developing-an-augmented-realioty-layer-for-layar/.

* cited by examiner

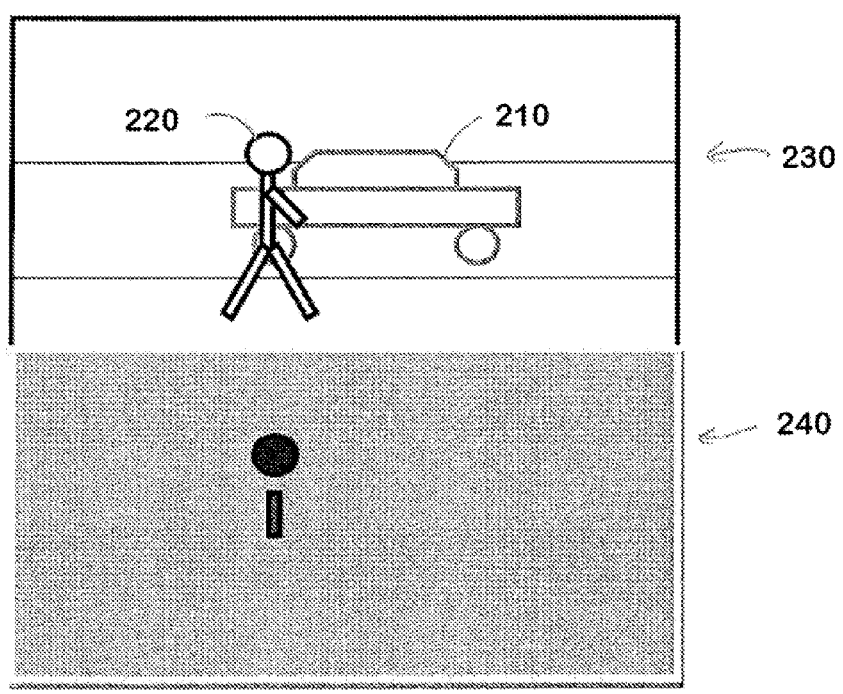

METHOD FOR REAL-TIME PROCESSING OF A VIDEO SEQUENCE ON MOBILE TERMINALS

RELATED APPLICATIONS

This application is a §371 application from PCT/EP2012/075828 filed Dec. 17, 2012, which claims priority from French Patent Application No. 11 61847 filed Dec. 16, 2011, each of which is herein incorporated by reference in its entirety.

TECHNICAL FIELD OF THE INVENTION

The present invention relates to the general area of image processing, particularly for video sequences on mobile terminals. It relates more specifically to a method for embedding images in real time into a video sequence representing moving people, for example.

INTRODUCTION AND PRIOR ART

In this field applications are already known that perform tracking and computer processing allowing the creation of successive morphological transformations resulting from complex computation (morphing) on a video stream. Nonetheless, these applications generally require prior processing and therefore cannot be described as real-time applications.

Other web applications (written in the Flash language) are also known that make it possible to incorporate an image into a video stream in real time. A process is applied to the image so that it follows the deformations due to the perspectives present in the video stream. This solution is only available on interconnected networks.

DISCLOSURE OF THE INVENTION

The invention relates to a method for processing a video sequence on mobile terminals, more precisely, to real-time embedding of images into the video stream. After computation of the embedding points, the video stream is read with the embedded images. In order to perform the embedding, the image is merged with the video stream, frame by frame. For each frame, the image is positioned in the correct place. This method involves the fact that the image undergoes a trapezoidal matrix transformation in real time so that it can adapt to the video stream.

The first aim of the invention is a method for embedding an image to be embedded into a video sequence, for a mobile terminal of tablet or smartphone type, characterized in that it includes steps:
- 100: of choosing an image to be embedded,
- 300: of reading the video sequence,
- 400: of displaying the frame,
- 500: of determining the presence of an embedding zone in the frame, said embedding zone having been previously identified in the frame, or deduced from the contents of the frame according to a predefined algorithm, and, if an embedding zone is identified in the current frame,
- 700: of displaying the image combining the frame and the image to be embedded, disposed in place of the embedding zone.

Note that step 100 can also occur after the beginning of step 300 of reading the video.

In a particular mode of implementation, the method includes a step 600 of applying a deformation to the image to be embedded, in such a way as to make this image to be embedded coincide with the shape of the embedding zone.

In a particular mode of implementation, the method includes a step 750 of tracking the movement of an embedding zone, by identifying pixel movements, either in real time using the known algorithms for detection of movements or shapes, or object recognition by training, or in pre-production.

In one mode of implementation, in step 500, the embedding zone is identified by way of touch input by a user on the display interface of the mobile terminal.

Alternatively, in step 500, in the case where the embedding points are not pre-computed, embedding points defining the embedding zone are computed in real time by the mobile terminal, using methods of image recognition by detection of movement or object recognition by training.

In a particular mode of implementation, in step 500, in the case of prior determination of the embedding points, a file including the coordinates of the embedding points in the video sequence is associated with said video sequence, in such a way as to be read (at the latest at the same time) by the mobile terminal.

In a particular mode of implementation, in step 500, in the case of an embedding zone of trapezoidal shape, the method includes means for reading a table of coordinates, which is associated with the video sequence, these coordinates representing, for each frame, the positions of the four extreme points of the embedding zone, i.e. of the image to be embedded in the video.

In a particular mode of implementation, in step 700, to insert the image to be embedded, when the video is displayed in real time on the mobile terminal, the method implements a function responsible for searching for the transformation of the image to be embedded with respect to the current frame, said function being called whenever a frame is displayed.

In a particular mode of implementation, in step 700, to insert the image to be embedded, the image from the video is merged with the image to be embedded by re-computing an image resulting from merging the raw data of the two images, and then said resulting image is displayed.

In a particular mode of implementation, the method includes some of the following steps:
- 1320 reading a frame of the video sequence,
- 1330 dividing the frame into at least two parts,
- 1350 reading the first part representing the original video sequence,
- 1360 reading the opacity information in a second part of the frame, corresponding to the secondary frame,
- 1370 applying the opacity to the main frame: detecting the color variations in the lower frame on a color channel to modify the opacity in the main frame,
- 1800 displaying the color masks.

Advantageously, in the case where the image to be embedded is a color mask, the method includes a step of synchronizing the mask with the video sequence.

In a particular mode of implementation, in this case, the video sequence and the mask are synchronized by a double video process: the original video sequence playing in a first part, intended to be displayed, and a second, undisplayed, part of this video sequence including only the information allowing the color changes and the modification of the opacity of the video sequence, the method including, during the display of the video sequence on the mobile terminal, a step of applying the opacity and/or color transformations provided by the second part to the first part.

In a more particular embodiment, in order to differentiate between the opacity and the applied color masks, the opacity, or mask, information is encoded in a color management format, one color channel managing the opacity and the other channels managing the objects.

PRESENTATION OF THE FIGURES

The features and advantages of the invention will be better appreciated owing to the following description, which discloses the features of the invention via a non-limiting exemplary application.

The description is based on the appended figures, in which:

FIG. 2 shows an illustration of a frame of a video sequence in the case of application of opacity to part of the image.

DETAILED DESCRIPTION OF AN EMBODIMENT OF THE INVENTION

Figure 1:
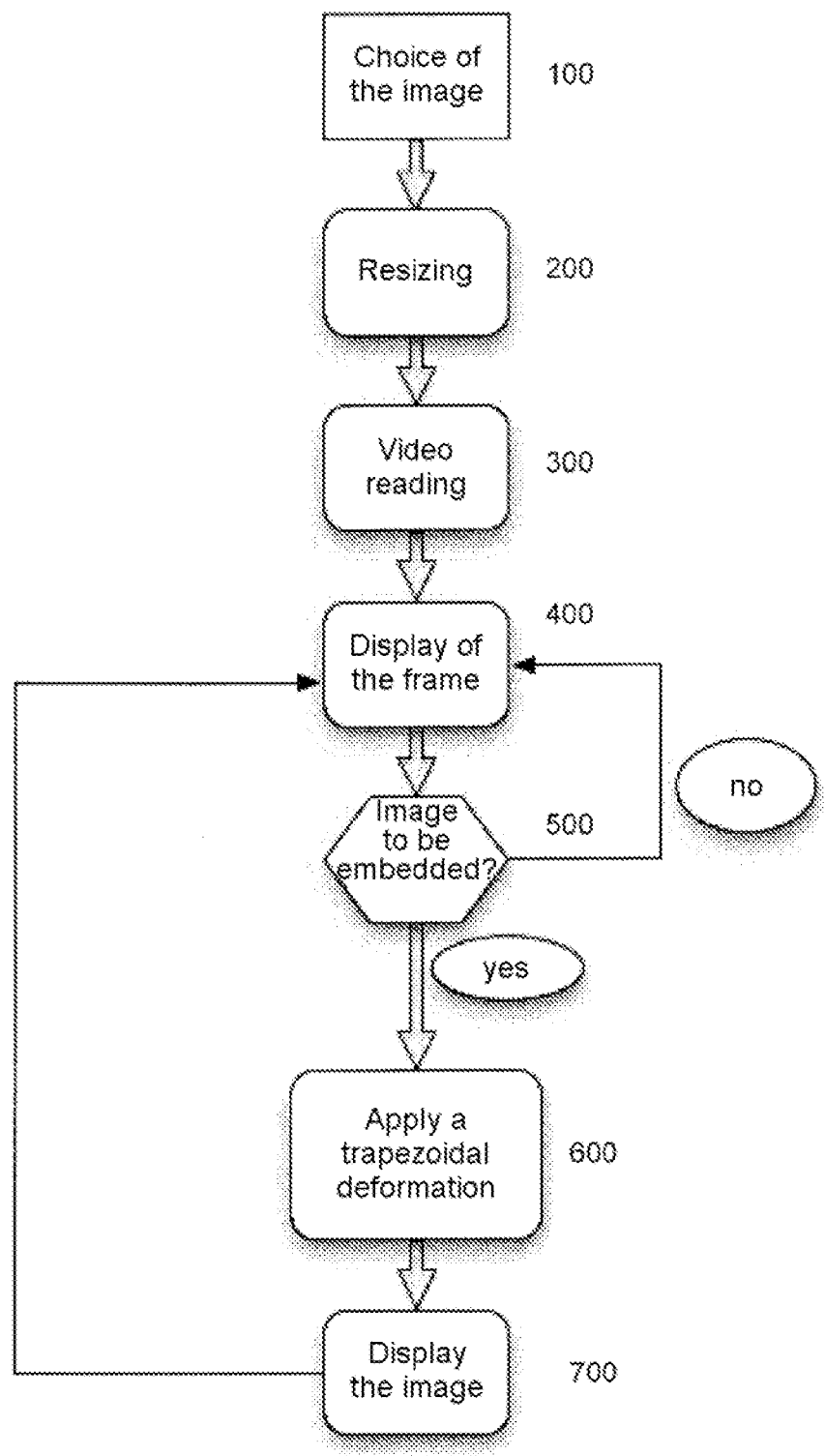
FIG. 1 shows a flow chart of the steps involved in the present method.

The invention employs a display terminal, in this case, but without being limiting, of smartphone type. This display terminal is, in the present non-limiting exemplary embodiment, supposed to be equipped with means for memorizing image sequences, computing means, for example of microprocessor type, suited to executing a software application previously loaded into memory, image display means, and advantageously means for the input of data by a user of said terminal.

The invention relates to a method for processing a video sequence on a mobile terminal, notably of smartphone type. The video sequence in question here, by way of example, includes people or objects moving inside the display zone during the video sequence.

The aim of the method is then to embed an image, called image to be embedded, into part of an object (for example the face of a person), called embedding zone, this image to be embedded tracking the movement of the embedding zone of this object over the video sequence, in such a way as to create an impression of realism.

By image is meant:
any 2D image
any image of a 3D object
any color mask
a video sequence composed of successive images.

The embedding zone can typically be the face of a person in motion, said person approaching or moving away from the camera, and the face being face-on or turning during the sequence. The embedding zone is a shape surrounding the part of the object to be replaced by the image to be embedded.

Typically, the image to be embedded is of trapezoidal, rectangular, polygonal or elliptical shape. The shape of the embedding zone is, in the present non-limiting exemplary implementation of the method, of the same type as the image to be embedded: for example, if the image to be embedded has the shape of a polygon, the embedding zone will be a polygon with the same number of sides, while possibly being deformed (different angles and different lengths of the sides). Similarly, if the image to be embedded has the shape of an ellipse, the embedding zone will also be elliptical.

In the common case where the embedding zone undergoes a deformation during the video sequence due to the movement of the object in relation to the point where the scene is shot, the method makes it possible to determine a deformation function for the embedding zone, and then to deform the image to be embedded in an analogous way.

In a particular embodiment, this method includes a step of pre-computing particular points in the video sequence, called embedding points (i.e. coordinates in time and over a predetermined zone of the display zone) defining the embedding zone, in order not to require any third-party involvement during embedding, and to be sufficiently economical of computing resources in order to be able to be used in mobile terminals.

In the case where the embedding points are not pre-computed, embedding points are computed in real time by the mobile terminal. This is performed for example using methods of image recognition by detection of movement or object recognition by training.

Then, in order to perform the embedding, the image to be embedded is merged into the video stream, frame by frame.

For each frame, the image to be embedded is positioned at the correct place, i.e. at the site of the embedding zone, reproducing the shape thereof.

The positioning at the site of the embedding zone requires prior identification of a moving zone incorporated into the video stream, by identification of the pixel movements either in real time using the known algorithms for detection of movements or shapes, or object recognition by training, or in pre-production.

In the case of pre-production, i.e. of prior determination of the embedding points, manually or by executing a software application if the extraction of the embedding points is complex (for example in the case of a search for a particular element in the object), a file including the coordinates of the embedding points in the video sequence is associated with said video sequence, so as to be read (at the latest at the same time) by the mobile terminal.

Moreover, it involves the fact that the image undergoes a matrix transformation in real time, for example trapezoidal, in order for it to be able to adapt to the video stream. This transformation is computed so that the image can be deformed in order to adapt to the perspective.

In this case of a trapezoidal embedding zone, each video sequence has a corresponding table of coordinates that represent for each frame the positions of the four extreme points of the embedding zone, i.e. of the image to be placed in the video.

To insert the image to be embedded, the method can use two techniques:

1) Either, when the video is played (i.e. displayed in real time), a function responsible for searching for the transformation with respect to the current frame is called whenever a frame is displayed.

If coordinates of an embedding zone are available for this frame, the image to be embedded is displayed, at these coordinates, after having been deformed so as to be fixed at the corresponding coordinates (four points in the case of a trapezoid). This means that, in a particular, non-limiting, mode of implementation, the shape of the image to be embedded and its position in the image must correspond exactly to the shape and the position of the embedding zone at that moment in the video sequence.

In the opposite case, if the coordinates of an embedding zone are not available, the image to be embedded is not displayed.

2) Or, the image from the video is merged with the image to be embedded by re-computing an image resulting from merging the raw data of the two images, and then said resulting image is displayed. This second technique makes it possible to save the resources of the mobile terminal.

It makes it possible to produce videos that react to touch and modify themselves as a function of said touch in a use on a mobile terminal possessing a touch-sensitive function.

For example, in a commercial, if the user touches the pair of trousers of a person on the video display, the pair of trousers becomes highlighted (which corresponds to the zone to be embedded). An item of information on this pair of trousers can then be displayed in a new window.

With reference to FIG. 1, it can be seen that the method includes a first step 100 of choosing the image to be embedded.

In a second step 200, the image to be embedded is resized by an adjustment from the user.

Next, in step 300, the video sequence is read.

Then a frame of this video sequence is displayed in step 400.

Next, step 500 determines whether the frame includes an embedding zone (to verify whether this image is liable to receive an image to be embedded).

If this is not the case, the method returns to step 400, otherwise step 600 is started.

In this step 600, a trapezoidal deformation is applied to the image to be embedded in such a way that the shape of the image to be embedded corresponds to the shape of the embedding zone.

Next, this image is displayed in step 700, as a replacement for the embedding zone. After this last step, the method returns to step 400.

Determination of the Embedding Maps and the Opacity of the Objects to be Embedded In order to be able to apply effects (shadows, light effects, move to the background of the image to be embedded) to the video sequence, in a variant embodiment, a step of the method consists in making the video sequence more or less opaque in places.

Since the image to be embedded can be a color mask, it is necessary to be able to synchronize the mask with the video sequence that is being considered: the display of the mask on the video sequence must be perfectly synchronized.

To do this, the video sequence and the mask are synchronized by a double video process: the original video sequence (without mask) plays in the visible part, but an undisplayed part of this video sequence is composed of the mask.

In order to differentiate between the opacity and the applied color masks, the opacity, or mask, information is encoded in the RGB format (or any other color management system), one color channel managing the opacity and the other channels managing the objects.

For example, as can be seen in FIG. 2, the object to be embedded is a car 210, and we wish to change the color of the head of a pedestrian 220 present in the original video sequence.

The opacity is coded on the channel B (Blue) and the color change on the channel R (Red).

The video sequence is broken down into two parts in this case: a first part 230, in this case, but without being limiting, the upper part of the image from the transmitted video file, representing the embedded object (the car) and the original video sequence, and a second part 240, in this case, but without being limiting, the lower part of the image from the transmitted video file, displaying only the information allowing the color changes and the modification of the opacity of the video sequence.

The information is therefore encoded in a single video file, and the display is responsible for applying the opacity and/or color transformations provided by the lower part to the upper part.

The method then includes the following additional steps:
1310 Loading the video file to be modified by embedding an image,
1320 Reading a frame of the video sequence,
1330 Dividing the frame into at least two parts,
1350 Reading the upper part (original video)
1360 Reading the opacity information in a second part of the frame, corresponding to the secondary frame,
1370 Applying the opacity to the main frame: detecting the color variations in the lower frame on a color channel to modify the opacity in the main frame:

For example, it is considered that the opacity is managed on the red channel, the lower frame has a pixel with an RGB color corresponding to a hexadecimal value of FF0000. The R value is therefore recovered, in this case FF, in order for it to be applied to the opacity of the pixel to be displayed in the main frame. The Alpha (opacity) channel of the main frame will therefore have FF as a value for the corresponding pixel.

800 Displaying the color masks

The transformation can be a color change. To be able to modify the color of various objects in real time, it is necessary to be capable of creating corresponding masks.

Each mask is encoded in RGB in the second part of the frame. This encoding is composed of 2 parts: one channel is used to manage the opacity of the mask, another channel to identify the mask.

Let us take for example an opacity over encoded on the R channel. If the value of the pixel is AA1122, it will be possible to deduce therefrom that the mask 1122 must be displayed, with an opacity having the value AA.

ADVANTAGES

The method as described has several advantages:
the embedded image gives an impression of melting into the context of the video.
the image appears at exactly the moment when the frame of the video stream is displayed.
several images can be embedded in one video, and at the same time, if several embedding zones have been defined.
the computing of the position of the image takes place in real time.
the computing and display take place on a mobile terminal.
the method makes it possible to modify the object of the video by touch interaction.

The invention claimed is:

1. A method for embedding an image in a video sequence for a mobile terminal, comprising the steps of:
choosing an image to be embedded;
reading a video sequence;
displaying a current frame of the video sequence;
determining the presence of an embedding zone in the current frame, said embedding zone been previously identified in a frame, or deduced from contents of the frame according to a predefined algorithm; and
displaying an image combining the frame and the image to be embedded in place of the embedding zone identified in the current frame.

2. The method as claimed in claim 1, further comprising the step of applying a deformation to the image to be embedded such that the image to be embedded coincides with a shape of the embedding zone.

3. The method as claimed in claim 1, further comprising the step of tracking a movement of the embedding zone by identifying pixel movements in pre-production or in real time by image recognition or using an algorithm for detecting movements or shapes.

4. The method as claimed in claim 1, wherein the embedding zone is identified by way of a touch input by a user on a display interface of the mobile terminal.

5. The method as claimed in claim 1, further comprising the step of computing embedding points defining the embedding zone in real time by the mobile terminal using an image recognition method for detecting a movement or by an object recognition.

6. The method as claimed in claim 1, wherein embedding points of the embedding zone is predetermined; and further comprising the step of associating a file comprising coordinates of the embedding points to the video sequence so the file can be read by the mobile terminal.

7. The method as claimed in claim 6, wherein the embedding zone has a trapezoidal shape; and further comprising the step of reading a table of coordinates, which is associated with the video sequence, the coordinates representing positions of four extreme points of the embedding zone for each frame.

8. The method as claimed in claim 1, further comprising the step of searching for transformation of the image to be embedded with respect to the current frame to insert the image to be embedded when the video sequence displayed in real time on the mobile terminal.

9. The method as claimed in claim 1, further comprising the steps of merging an image from the video sequence with the image to be embedded by re-computing an image resulting from merging raw data of the two images and displaying the resulting image.

10. The method as claimed in claim 1, further comprising the steps of:
reading a frame of the video sequence;
dividing the frame into at least two parts;
reading a first part representing an original video sequence;
reading opacity information in a second part of the frame, corresponding to a secondary frame;
applying the opacity to a main frame by detecting color variations in a lower frame on a color channel to modify the opacity in the main frame; and
displaying color masks.

11. The method as claimed in claim 10, wherein the image to be embedded is a color mask; and further comprising the step of synchronizing the color mask with the video sequence.

12. The method as claimed in claim 11, wherein the video sequence and the color mask are synchronized by a double video process, the original video sequence playing in a first part intended to be displayed, and a second, undisplayed, part of the original video sequence comprising only information allowing color changes and modification of the opacity of the video sequence; and further comprising the step of applying at least one of the opacity or color transformations provided by the second part to the first part during the display of the video sequence on the mobile terminal.

13. The method as claimed in claim 12, further comprising the step of encoding opacity or mask information in a color management format to differentiate between the opacity and applied color masks, one color channel managing the opacity and other channels managing objects.

14. The method as claimed in claim 1, wherein the mobile terminal is a tablet or a smartphone.

\* \* \* \* \*